United States Patent
Goetz et al.

(10) Patent No.: US 10,211,485 B2
(45) Date of Patent: Feb. 19, 2019

(54) BATTERY SYSTEM

(71) Applicant: Dr. Ing. h.c. F. Porsche Aktiengesellschaft, Stuttgart (DE)

(72) Inventors: Stefan Goetz, Forstern (DE); Ralf Bauer, Neckarsulm (DE); Harald Schoeffler, Obersulm-Eschenau (DE); Juergen Mittnacht, Grafenau (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 145 days.

(21) Appl. No.: 15/095,273

(22) Filed: Apr. 11, 2016

(65) Prior Publication Data

US 2016/0322672 A1    Nov. 3, 2016

(30) Foreign Application Priority Data

Apr. 30, 2015 (DE) .................. 10 2015 106 771

(51) Int. Cl.
  *H01M 10/42* (2006.01)
  *B60L 11/18* (2006.01)
  *H02J 7/14* (2006.01)
(52) U.S. Cl.
  CPC ....... *H01M 10/425* (2013.01); *B60L 11/1812* (2013.01); *H01M 2010/4271* (2013.01); *H01M 2220/20* (2013.01); *H02J 7/1423* (2013.01)
(58) Field of Classification Search
  USPC ........................................................ 320/108
  See application file for complete search history.

(56) References Cited

U.S. PATENT DOCUMENTS

| | | | |
|---|---|---|---|
| 2009/0072625 A1* | 3/2009 | Oga | H01M 10/482 307/80 |
| 2009/0079384 A1 | 3/2009 | Harris | |
| 2012/0007557 A1 | 1/2012 | Hayashigawa | |
| 2012/0091731 A1 | 4/2012 | Nelson | |
| 2012/0200242 A1 | 8/2012 | Grady | |
| 2013/0127400 A1 | 5/2013 | Oh et al. | |
| 2013/0300192 A1 | 11/2013 | Inaba | |
| 2014/0117763 A1 | 5/2014 | Tiefenbach | |
| 2014/0217986 A1* | 8/2014 | Skipper | H02J 7/0057 320/134 |

FOREIGN PATENT DOCUMENTS

| | | |
|---|---|---|
| DE | 10 2011 077 708 | 12/2012 |
| DE | 10 2011 077 719 | 12/2012 |
| DE | 10 2014 006 772 | 11/2015 |

OTHER PUBLICATIONS

Korean Office Action dated Feb. 1, 2017.
German Search Report dated Nov. 25, 2015.

* cited by examiner

*Primary Examiner* — Bryce M Aisaka
(74) *Attorney, Agent, or Firm* — Gerald E. Hespos; Michael J. Porco; Matthew T. Hespos

(57) ABSTRACT

A battery system (10) has a battery (12) for providing a first voltage and has at least one tap (15, 19, 21) that divides the battery (12) into at least one first battery element (14) for providing a first partial voltage and at least one second battery element (16) for providing a second partial voltage. A power changeover switch (18) is arranged between the at least one first battery element (14) and the at least one second battery element (16) and is designed to change over between the at least one first battery element (14) and the at least one second battery element (16) at a changeover rate to be specified.

8 Claims, 1 Drawing Sheet

BATTERY SYSTEM

CROSS REFERENCE TO RELATED APPLICATION

This application claims priority under 35 USC 119 to German Patent Appl. No. 10 2015 106 771.4 filed on Apr. 30, 2015, the entire disclosure of which is incorporated herein by reference.

BACKGROUND

1. Field of the Invention

The invention relates generally to a battery system and specifically to a battery system for use in vehicles.

2. Description of the Related Art

In modern vehicles, a multiplicity of fittings emerge as consumers of electrical energy. The energy required usually is provided by a central energy source in the form of a battery. However, the respective consumers require very different input voltages. As a result, it is necessary to convert the voltage provided by the battery into the required voltages with the aid of a DC-DC converter. The more end consumers require energy, the greater the voltage provided by the central energy source needs to be. With higher energy consumption, the DC-DC converters also become larger, heavier and accordingly expensive. In addition, there is a reduced supply of charging options for directly charging high-voltage batteries, with the result that a large DC-DC converter would also be required for this.

US 2009/0079384 describes a charging system for a vehicle that changes over a bank of battery cells between a series connection for outputting voltage to a load, for example an engine, and a parallel connection for charging.

US 2012/0007557 describes a method for charging and discharging a battery-based power supply of an electric vehicle, in which a plurality of batteries are charged using a series connection to a quick-charging device and are connected to an electric vehicle in a parallel connection during discharging.

US 2012/0091731 describes a battery charging system that controls the arrangement of batteries that are arranged in battery banks, between a series connection during driving of an electrical load and a parallel connection during charging.

US 2012/0200242 describes a method for operating an electrical system in a vehicle having an internal combustion engine, in which two batteries of the same but opposing voltage are connected to a bipolar DC output in an electrical circuit, the center tap being grounded, and a three-phase generator being integrated in the circuit in order to control the electrical charge to the batteries.

US 2013/0127400 describes an electric vehicle having a high-voltage battery for driving the electric vehicle, a plurality of consumers and an auxiliary battery for providing drive current for the consumers that comprise a detection unit for a first voltage, a voltage converter, a power relay arrangement and a vehicle control unit.

The prior art results in the object of integrating a high-voltage battery in an automobile electrical system in an improved manner.

SUMMARY

The invention provides a battery system having a battery for providing a first voltage and having at least one tap that divides the battery into at least one first battery element for providing a first partial voltage and at least one second battery element for providing a second partial voltage. A power changeover switch is arranged between the at least one first battery element and the at least one second battery element and is designed to change over between the at least one first battery element and the at least one second battery element at a changeover rate to be determined or defined or specified.

This ensures, in yet another embodiment, that substantially the same amount of energy is removed from the at least one first battery element and the at least one second battery element.

The voltage provided by the at least one first battery element may be equal to a voltage provided by the at least one second battery element. This can be achieved, for example, by the tap by virtue of the tap being effected in the center of the battery, thus forming battery elements that each provide the same voltage.

The power changeover switch that changes over between the batteries may either be integrated in the battery or may be arranged outside the battery.

The power changeover switch may be unidirectional or bidirectional.

The changeover rate of the changeover operation from the at least one first battery element to the at least one second battery element or from the at least one second battery element to the at least one first battery element can be adapted by a control unit.

The changeover rate of the changeover operation from the at least one first battery element to the at least one second battery element or from the at least one second battery element to the at least one first battery element may be less than 1 hertz (Hz).

Further advantages and configurations of the invention emerge from the description and the accompanying drawings. The features mentioned above and those explained below can be used in the stated combination and also in other combinations or alone without departing from the scope of the present invention.

The invention is schematically illustrated using embodiments in the drawing and is schematically described in detail with reference to the drawings.

DETAILED DESCRIPTION

Figure 1:
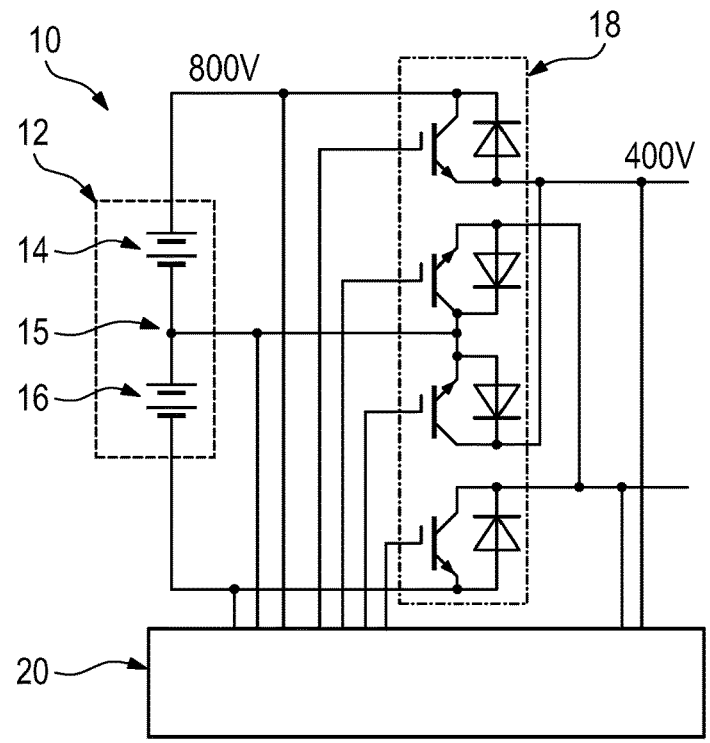
FIG. 1 shows an embodiment of the battery system according to the invention with a unidirectional implementation of the power changeover switch and two battery elements.

A circuit for implementing one embodiment of the battery system 10 according to the invention in a unidirectional form, as is used in an automobile electrical system for example, is substantially illustrated with reference to FIG. 1. A center tap 15 divides a battery 12 into a first battery element 14 and a second battery element 16. In the exemplary embodiment of the battery system 10 according to the invention shown, the battery 12 provides a total voltage of 800 volts. As a result of the center tap 15, the total voltage provided is divided between the two battery elements 14, 16. As a result, the first battery element 14 provides a first partial voltage of 400 volts, and the second battery element 16 provides a second voltage of likewise 400 volts. In order to avoid asymmetrical discharging of the battery elements 14, 16, a power changeover switch 18 with a unidirectional switching procedure is connected between the two battery elements 14, 16 and a 400 volt energy network. The power changeover switch 18 changes back and forth between the first battery element 14 and the second battery element 16 at a low frequency. In this case, the frequency is of an order of magnitude of approximately 1 hertz. The practice of switching back and forth ensures that substantially the same amount of energy is removed from the first battery element 14 and the second battery element 16. Since the power changeover switch 18 operates at a very low switching frequency and does not contain any magnetic components, it operates virtually with an efficiency of 100 percent. A control unit 20 is likewise integrated in the circuit. The control unit 20 is used to fine tune the charge balance of the first battery element 14 and of the second battery element 16 and has connections to the power changeover switch 18 and the battery 12 or the battery elements 14, 16 and the tap 15. The control unit 20 which may also include a gate driver, for example, adapts the duty cycle of the changeover, that is to say the frequency or the changeover rate at which switching is carried out back and forth between the first battery element 14 and the second battery element, and accordingly also the length of time for which charge is respectively removed from a battery element 14, 16.

In the exemplary embodiment of the battery system 10 according to the invention shown, the power changeover switch 18 is arranged outside the battery 12. However, it is also conceivable for the power changeover switch 18 to be arranged inside the battery 12. The power changeover switch 18 may also be bidirectional. This also makes it possible to separately charge the first battery element 14 and the second battery element 16 using a 400 volt charging station or a 400 volt charging device, for example. As a result, it is possible to dispense with a large DC-DC converter. As a result, the charging duration would not be increased but rather would even be reduced since possible losses in the DC-DC converter would disappear.

However, the battery system 10 according to the invention is not restricted to the exemplary voltages mentioned. It is likewise conceivable for more than two battery elements to be formed. For example, it is conceivable for the battery system according to the invention to operate with a 900 volt vehicle electrical system and three battery elements.

Figure 2:
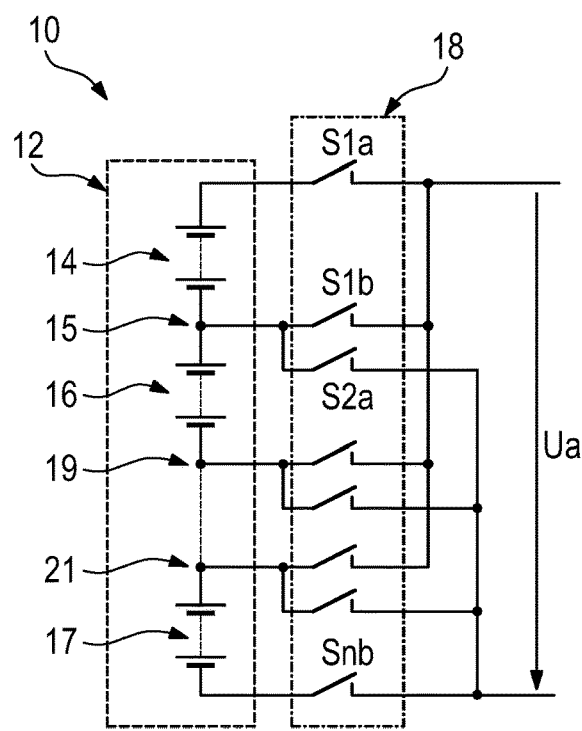
FIG. 2 shows a basic embodiment of the battery system according to the invention with a number n of battery elements and (n–1) taps.

An exemplary circuit of the battery system 10 according to the invention for an unlimited number n of battery elements is shown in FIG. 2. A battery 12 is divided into a plurality of battery elements 14, 16, 17 by a plurality of taps 15, 19, 21. In this case, the first battery element is denoted using 14, the second battery element is denoted using 16 and the nth battery element is denoted using 17. In this case, the tap 15 is the tap between the first battery element 14 and the second battery element 16, and the tap 19 therefore corresponds to the tap between the second battery element 16 and a third battery element (not shown). The arrangement of possibly a plurality of further battery elements between the third battery element and the (n−1)th battery element is indicated by a dashed line. The tap 21 is the (n−1)th tap between the (n−1)th battery element and the nth battery element 17. A power changeover switch 18 which switches back and forth between the corresponding battery elements is integrated in the circuit. A battery element circuit therefore has two switches. The switches are denoted in accordance with their assignment to a battery element circuit. A switch $S1a$ is therefore a first switch a in the circuit element of the first battery element 14. Switch $S1b$ is therefore a second switch b in the circuit element of the first battery element 14. In a generalized manner, the switches are denoted using Snj, where n=1, 2, 3, . . . , n and j=a, b. Switch b in the circuit element of the third battery element would accordingly be denoted using $S3b$. A corresponding output voltage Ua is produced at one end of the circuit according to the position of the switches.

The battery system 10 according to the invention therefore provides a system in which voltages can be generated from a central high-voltage battery, for example an 800 volt battery, in order to supply components with a lower input voltage, for example 400 volts, 48 volts or 12 volts. It is possible to dispense with large, heavy and accordingly expensive DC-DC converters using the battery system 10 according to the invention. The battery system according to the invention can be operated using conventional components available on the market. It is likewise possible to resort to conventional components in order to charge the high-voltage battery.

What is claimed is:

1. A battery system comprising:
   a battery for providing a first voltage and having at least one tap that divides the battery into at least one first battery element for providing a first partial voltage and at least one second battery element for providing a second partial voltage, the at least one first battery element and the at least one second battery element each including a first side and a second side, the tap being coupled to the second side of the at least one first battery element and the first side of the at least one second battery element, wherein the first partial voltage and the second partial voltage are equal;
   a power changeover switch including a plurality of switches, wherein the at least one first battery element is assigned a first switch and a second switch and the at least one second battery element is assigned a third switch and a fourth switch, the first switch coupled the first side of the at least one first battery element, the second and third switches each coupled to the tap, and the fourth switch coupled to the second side of the at least one second battery element, the power changeover switch being designed to change over between the at least one first battery element and the at least one second battery element via the plurality of switches at a changeover rate to be specified to provide an output voltage equal to the first partial voltage and the second partial voltage.

2. The battery system of claim 1, wherein the power changeover switch is integrated in the battery.

3. The battery system of claim 1, wherein the power changeover switch is arranged outside the battery.

4. The battery system of claim 1, wherein the power changeover switch is unidirectional or bidirectional.

5. The battery system of claim 4, wherein the at least one first battery element and the at least one second battery element can be charged separately from one another.

6. The battery system of claim 1, wherein the same amount of energy is removed from the at least one first battery element and the at least one second battery element.

7. The battery system of claim 1, further comprising a control unit configured for adapting the changeover rate of the changeover operation.

8. The battery system of claim 1, in which the changeover rate of the changeover operation is less than 1 hertz (Hz).

* * * * *